(12) United States Patent
Kim et al.

(10) Patent No.: US 6,751,252 B1
(45) Date of Patent: Jun. 15, 2004

(54) QUASI-ORTHOGONAL CODE MASK GENERATING DEVICE IN MOBILE COMMUNICATION SYSTEM

(75) Inventors: Jae-Yoel Kim, Kunpo-shi (KR); Jae-Min Ahn, Seoul (KR); Joong-Ho Jeong, Seoul (KR); Kyeong-Cheol Yang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/358,149

(22) Filed: Jul. 20, 1999

(30) Foreign Application Priority Data

Jul. 20, 1998 (KR) .............................. 98-29576

(51) Int. Cl.$^7$ .............................................. H04B 1/69
(52) U.S. Cl. ...................................... 375/140; 375/145
(58) Field of Search ............................. 375/140, 141, 375/146, 367, 365, 130, 147, 148, 149, 150, 377, 145; 380/273; 341/50

(56) References Cited

U.S. PATENT DOCUMENTS

| | | |
|---|---|---|
| 5,136,611 A | 8/1992 | Kirimoto et al. |
| 5,416,797 A * | 5/1995 | Gilhousen et al. .......... 375/105 |
| 5,519,736 A * | 5/1996 | Ishida ........................ 375/367 |
| 5,546,423 A | 8/1996 | Sehier et al. |
| 5,596,518 A | 1/1997 | Toyokura et al. |
| 5,799,035 A * | 8/1998 | Lattard et al. .............. 375/206 |
| 6,339,646 B1 * | 1/2002 | Dahlman et al. ........... 380/273 |

FOREIGN PATENT DOCUMENTS

EP 565506 A2 10/1993

OTHER PUBLICATIONS

Olsen et al., Bent–Function Seqences, Nov. 1982, IEEE Transactions on Information Theory, Vol. IT–28, No. 6, p. 858–864.*
Fairchild Semiconductor, 74VHC161 4–bit Binary Counter with Asynchronous Clear, Aug. 1993, p. 1–10.*
Kumar, Frequency–Hopping Code Sequence Designs Having Large Linear Span, Jan. 1998, p. 146–151.*
Texas Instruments, SDLS078, Dec. 1972, pp. 1–11.*
"International Search Report", Jan. 25, 2000.
McWilliams and Sloane, "The Theory of Error–Correcting Code", Chapter 15, Section 5, pps. 426–432.

* cited by examiner

Primary Examiner—Stephen Chin
Assistant Examiner—Sam K. Ahn
(74) Attorney, Agent, or Firm—Dilworth & Barrese LLP (57) ABSTRACT

A device for generating a quasi-orthogonal code mask in a communication system. A counter generates first to eighth counter signals x1–x8 representing Bent functions. A logic operator receives the first to eighth counter signals x1–x8 and performs an operation, for example $x1*x2+x1*x3+x1*x4+x1*x5+x1*x7+x1*x8+x2*x6+x2*x7+x3*x4+x3*x5+x3*x6+x4*x5+x4*x6+x4*x7+x4*x8+3x5*x7+x7*x8+x1+x2+x5+x7$, to generate a mask signal.

21 Claims, 7 Drawing Sheets

QUASI-ORTHOGONAL CODE MASK GENERATING DEVICE IN MOBILE COMMUNICATION SYSTEM

BACKGROUND OF THE INVENTION

1. Field of the Invention

The present invention relates to an encoding device in mobile communication systems, and more particularly, to a quasi-orthogonal code mask generating device.

2. Description of the Related Art

In CDMA (Code Division Multiple Access) communication systems, orthogonal modulation using orthogonal codes provides channelization among code channels as a way of increasing channel capacity. IS-95/IS-95A applies the orthogonal channelization on a forward link, and a reverse link can be applied through time alignment.

Figure 1:
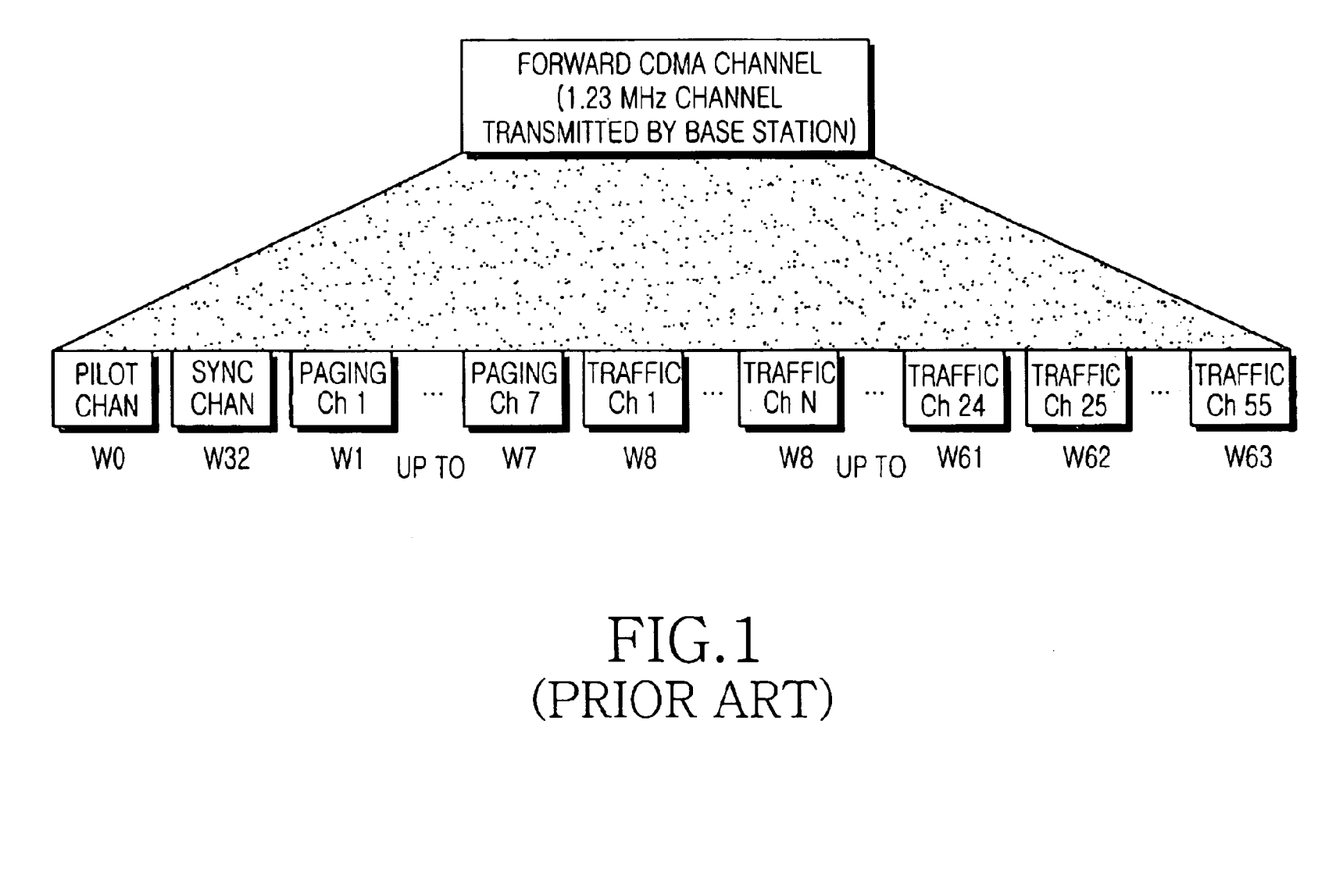
FIG. 1 illustrates orthogonal channelization among forward code channels in a CDMA communication system in accordance with the prior art.

Channels on the forward link in IS-95/IS-95A are distinguished by different orthogonal codes as shown in FIG. 1. Referring to FIG. 1, "W" indicates an orthogonal code and each code channel is identified by a preassigned orthogonal code. The forward link uses a convolutional code with a code rate R=½, BPSK (Binary Phase Shift Keying) modulation, and a bandwidth of 1.2288 MHz. Therefore, orthogonal codes can provide channelization among 64 forward channels (=1.2288 MHz/9.6÷2).

Once a modulation scheme and a minimum data rate have been determined, the number of available orthogonal codes can be obtained. In the future CDMA communication systems may increase channel capacity by increasing the number of channels, which includes a traffic channel, a pilot channel, and a control channel resulting in improved performance.

However, the increase in the number of channels causes a shortage in the number of available orthogonal codes, thereby limiting channel capacity. This disadvantage can be overcome by using quasi-orthogonal codes, which incur minimum interference with orthogonal codes, and a variable data rate.

The generation of quasi-orthogonal codes is disclosed in Korea Application Patent No. 97-47257. In order to generate a quasi-orthogonal code, quasi-orthogonal code sequence mask values are stored in a memory and retrieved for use as needed. If a mask value occupies 64 bits, a 64-bit memory is required. Therefore, the conventional quasi-orthogonal code mask generation scheme has a disadvantage of requiring increased hardware complexity.

SUMMARY OF THE INVENTION

Therefore, an object of the present invention is to provide a device for generating quasi-orthogonal code mask values with minimum interference with orthogonal codes in a mobile communication system which uses orthogonal codes.

Another object of the present invention is to provide a device for generating quasi-orthogonal code mask values using a Bent function in a mobile communication system which uses orthogonal codes.

To achieve the above objects, a device for generating a quasi-orthogonal code mask in a communication system is provided. In the device, a counter generates first to eighth counter signals x1–x8 representing Bent functions, and a logic operator receives the first to eighth counter signals x1–x8 and performs an operation of x1*x2 +x1*x3+x1*x4+ x1*x5+x1*x7+x1*x8+x2*x6+x2*x7+x3*x4+x3*x5+ x3*x6+x4*x5+x4*x6+x4*x7+x4*x8+x5*x7+x7*x8+x1+ x2+x5+x7 to generate a mask signal.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENT

The present invention is directed to a device and method for simply generating a quasi-orthogonal code mask value using a Bent function (see, Macwilliams and Sloane, The Theory of Error-Correcting Code). In the prior art (Korea Application Patent No. 97-47257), a quasi-orthogonal code mask is a Kasami sequence resulting from X-ORing two PN sequences. The Kasami sequence can be expressed as a set of two-Bent function combinations. Accordingly, a quasi-orthogonal code mask value is expressed as a set of two-Bent function combinations and implemented using hardware as set forth in the present invention.

For masks of quasi-orthogonal sequences with a length of 64 bits, for example, the appropriate Bent functions are listed in Table 1.

TABLE 1 x1 = 0101010101010101010101010101010101010101010101010101010101010101
x2 = 0011001100110011001100110011001100110011001100110011001100110011
x3 = 0000111100001111000011110000111100001111000011110000111100001111
x4 = 0000000011111111000000001111111100000000111111110000000011111111
x5 = 0000000000000000111111111111111100000000000000001111111111111111
x6 = 0000000000000000000000000000000011111111111111111111111111111111

The quasi-orthogonal sequence masks can be calculated using the six Bent functions of Table 1 as shown in Table 2 below:

TABLE 2

M1 = X1*X2 + X1*X3 + X2*X3 + X2*X4 + X1*X5 + X4*X6
M2 = X1*X2 + X1*X3 + X3*X4 + X2*X5 + X3*X5 + X2*X6 + X4*X6 + X5*X6
M3 = X1*X2 + X2*X4 + X3*X4 + X1*X5 + X4*X5 + X1*X6 + X5*X6

+ represents modulo 2 addition

Accordingly, the resulting quasi-orthogonal masks are as shown in Table 3 below:

TABLE 3

M1 = 0001011100100100010000100111000100010111110110110100001010001110
M2 = 0001010000110110010100000100111001001111101011111100100000010100
M3 = 0001000100101101010001001000011101000100011100011011100010101

The Bent functions shown in Table 1 are produced based on a rule. That is, for quasi-orthogonal sequences with length $64=2^6$, one 0 and one 1 ($2^0=1$) alternate in Bent function x1, two consecutive 0s and is 1s ($2^1=2$) alternate in Bent function x2, four consecutive 0s and 1s ($2^2=4$) alternate in Bent function x3, eight consecutive 0s and 1s ($2^3=8$) alternate in Bent function x4, sixteen consecutive 0s and 1s ($2^4=16$) alternate in Bent function x5, and thirty two consecutive 0s and 1s ($2^5=32$) alternate in Bent function x6. Each of the above Bent functions x1 to x6 are repeated until a length of 64 is reached.

In light of the foregoing, eight Bent functions are needed to produce quasi-orthogonal sequences with length $256=2^8$. These Bent functions can be generated by repeating each of the six Bent functions shown in Table 1 four times to reach the desired length of 256, and adding Bent functions x7 and x8. Bent function x7 is generated by alternating 64 consecutive 0s and 1s and Bent function x8 is generated by alternating 128 consecutive 0s and 1s, each sequence being repeated until a length of 256 is reached.

functions x1 to x6, each having 64 binary values, into the M1 generation formula of Table 2. Hence, the masks can be expressed as sets of two-Bent function combinations.

The mask generation formulas shown in Table 4 are obtained using the following procedure. Assuming that a Bent function $f(v_1, \ldots, v_k)$, with k variables, is given, there are only two Boolean functions $f_1(v_1, \ldots, v_{k-1})$ and $f_2(v_1, \ldots, v_{k-1})$ each having (k-1) variables which satisfy the equation below.

$$f(v_1, \ldots, v_k) = f_1(v_1, \ldots, v_{k-1}) + v_k(f_1(v_1, \ldots, v_{k-1}) + f_2(v_1, \ldots, v_{k-1}))$$

Then, a sequence function having a period $2^m$ can be expressed in terms of a period $2^{m-1}$ sequence function which, in turn, can be expressed in terms of a sequence function having a period $2^{m-2}$. The period $2^m$ sequence function expression can be achieved by repeating this procedure m−1 times.

To produce a set of two-Bent function combinations for a length-8 quasi-orthogonal code mask of 00010111, 00 and 01 of length 2 in the first half term (0001) can be expressed as 0 and x1, respectively, in the first-order Bent, and then the term 0001 of length 4 become 0+x2x(0+x1)=x1x2 in the second-order Bent.

01 and 11 of length 2 in the last half term (0111) are expressed as x1 and 1, respectively, in the first-order Bent,

TABLE 4

M1 = X1*X2 + X1*X3 + X2*X4 + X1*X5 + X4*X5 + X2*X6 + X3*X6 + X4*X6 + X1*X7 + X4*X7 + X5*X7 + X3*X8 + X4*X8
M2 = X1*X2 + X1*X3 + X1*X4 + X3*X4 + X3*X5 + X4*X5 + X1*X6 + X3*X6 + X4*X6 + X5*X6 + X1*X7 + X3*X7 + X4*X7 + X6*X7 + X1*X8 + X2*X8 + X4*X8 + X6*X8
M3 = X1*X2 + X2*X3 + X2*X4 + X3*X4 + X2*X5 + X4*X5 + X1*X6 + X5*X6 + X3*X7 + X4*X7 + X5*X7 + X1*X8 + X3*X8 + X4*X8 + X5*X8 + X7*X8
M4 = X1*X2 + X2*X3 + X1*X4 + X1*X5 + X2*X5 + X3*X5 + X4*X5 + X2*X6 + X4*X7 + X6*X7 + X2*X8 + X4*X8 + X5*X8 + X6*X8 + X7*X8
M5 = X1*X2 + X2*X4 + X3*X4 + X2*X5 + X3*X5 + X4*X6 + X3*X7 + X4*X7 + X6*X7 + X5*X8 + X7*X8
M6 = X1*X2 + X1*X3 + X2*X3 + X2*X4 + X1*X5 + X3*X5 + X1*X6 + X2*X6 + X3*X6 + X5*X6 + X1*X7 + X4*X7 + X6*X7 + X1*X8

+ represents modulo 2 addition

For the quasi-orthogonal sequences with a length of 64, the masks M1, M2, and M3 are calculated by applying the formulas of Table 2 to the Bent functions x1 to x6 of Table 1. The results of these calculations are shown in Table 3. For example, the mask M1 is produced by entering the Bent and then the term 0111 of length 4 becomes x1+x2x(x1+1)=x1+x2+x1x2 in the second-order Bent.

Then, the entire mask function 00010111 is defined as x1x2+x3x(x1x2+x1+x2+x1x2)=x1x2+x3x(x1+x2)=x1x2+x1x3+x2x3.

The scheme of expressing a mask function as a set of two-Bent function combinations can be implemented using the following algorithm (for providing a Boolean function expression):

(Equation 1)

```
1   N := 2^m; flag := 0; period := 1;
2   WHILE period < N DO
3       count := 0
4       FOR i = 1 TO N
5           IF flag=1 THEN DO
6               f[i] = f[i] +f[i−period]
7           count := count + 1
8           IF count = period THEN DO
9               flag = flag + 1
10          period := period × 2
```

Complex quasi-orthogonal code can be expressed as sign and phase parts. Similarly, sign components of a complex quasi-orthogonal code mask can be expressed as a set of two-function combinations. Table 6 and Table 8 show sets of two-Bent function combinations for sign components of a complex quasi-orthogonal code mask with length 256 as shown in Table 5 and sign components of a complex quasi-orthogonal code mask with length 512 as shown in Table 7, respectively.

TABLE 5

| | | |
|---|---|---|
| M1 | Sign | 0111001000101000110101110111001001001110111010111110101110110001<br>1110101101001110101100011110101111010111100011011000110100101000<br>0010011110000010100000101101100000011011010000011011111000011011<br>0100000100011011000110111011111001111101110110000010011101111101 |
| M2 | Sign | 0001000101001011000111100100010001000100111000010100101111101110<br>1110111001001011111000010100010010111011111100001101101001110111 0<br>1101110110000111001011010111011110001000001011010111100011011101<br>0010001010000111101001001110111011110110010110110000111111011101 |
| M3 | Sign | 0001011100100100101111010111000110110010100000010001100011010100<br>1000111010111011101101100010111001010110001100011111010110010<br>1110011111010100101001001111110101111011000111011101000001001 00<br>100000011011001000101011110011111011011111010000111000110111101 |

TABLE 6

M1 = X1X2 + X1X3 + X1X4 + X1X5 + X1X7 + X1X8 + X2X6 + X2X7 + X3X4 + X3X5 + X3X6 + X4X5 + X4X6 + X4X7 + X4X8 + X5X7 + X7X8 + X1 + X2 + X5 + X7
M2 = X1X2 + X1X4 + X1X6 + X2X8 + X3X4 + X3X5 + X4X6 + X4X7 + X5X8 + X7 + X8
M3 = X1X2 + X1X3 + X1X5 + X1X6 + X1X7 + X2X3 + X2X4 + X2X7 + X3X6 + X3X8 + X4X5 + X5X7 + X5X8 + X6X8 + X7X8 + X5 + X6 + X7 + X8

+ represents modulo 2 addition

TABLE 7

| | | |
|---|---|---|
| M1 | Sign | 0100110111011011110110111011001000100010010011010100110111011011<br>0010010001001101010011011110110111011001000100100000100100001001101<br>0010010001001101010011011110110111011001000100100000100100001001101<br>1011001000100100001001000100110111011011101100101011001000100100<br>0100110111011011110110111011001000100010010011010100110111011011<br>0010010001001101010011011110110111011001000100100000100100001001101<br>0010010001001101010011011110110111011001000100100000100100001001101<br>1011001000100100001001000100110111011011101100101011001000100100 |
| M2 | Sign | 0001000101001011011110000010001000011110010001000111011100101101<br>0100010011100001001011011000100010110100000100011101110101111000<br>0111100000100010111011101011010101001000010011010010000011110010100<br>1101001001110111010001001110000111011101011110000100101111101110<br>0001110010001001000100011010010111011101101000111100000100010<br>1011010000010010010010100001111011101100011110001011011000100<br>0111011001011010001111001000100011110000010001000010010011<br>00100010100001110100101111101111011010010011101111011110110011110 |
| M3 | Sign | 0111010000010010110111100010001110010111001001000100000010000011101<br>1110001010000100101101110010111001000110010000100010100001011<br>1101111001000111011101000000100100111101111100010110100011011111<br>0100100011000100010011010111110110011001010100110001110011001<br>01000111110111011011011000101111000100111101101001000010111<br>110100010100100010001001100001000010110010011010111110101110<br>000100100111010010111000001000010100100000100111011111000100111101<br>1000010011100010110100010101001000000100001010001110111010011101101 |

TABLE 8

M1 = X1X2 + X1X3 + X1X4 + X1X5 + X1X6 + X1X7 + X1X8 + X2X3 + X2X4 + X2X5 + X2X6 + X2X7 + X2X8 + X3X4 + X3X5 + X3X6 + X3X7 + X3X8 + X4X5 + X4X6 + X4X7 + X4X8 + X5X6 + X5X7 + X5X8 + X6X7 + X6X8 + X7X8 + X1 + X3 + X4 + X5
M2 = X1X2 + X1X4 + X1X5 + X1X7 + X1X8 + X2X5 + X2X8 + X3X4 + X3X5 + X3X6 + X3X8 + X3X9 + X4X7 + X5X8 + X5X9 + X6X7 + X6X8 + X6X9 + X7X8 + X7X9
M3 = X1X2 + X1X4 + X1X5 + X1X6 + X1X7 + X1X8 + X2X3 + X2X4 + X2X7 + X2X9 + X3X6 + X3X7 + X4X5 + X4X8 + X4X9 + X5X7 + X6X7 + X6X8 + X6X9 + X8X9 + X1 + X2 + X5 + X7 + X8

Figure 2:
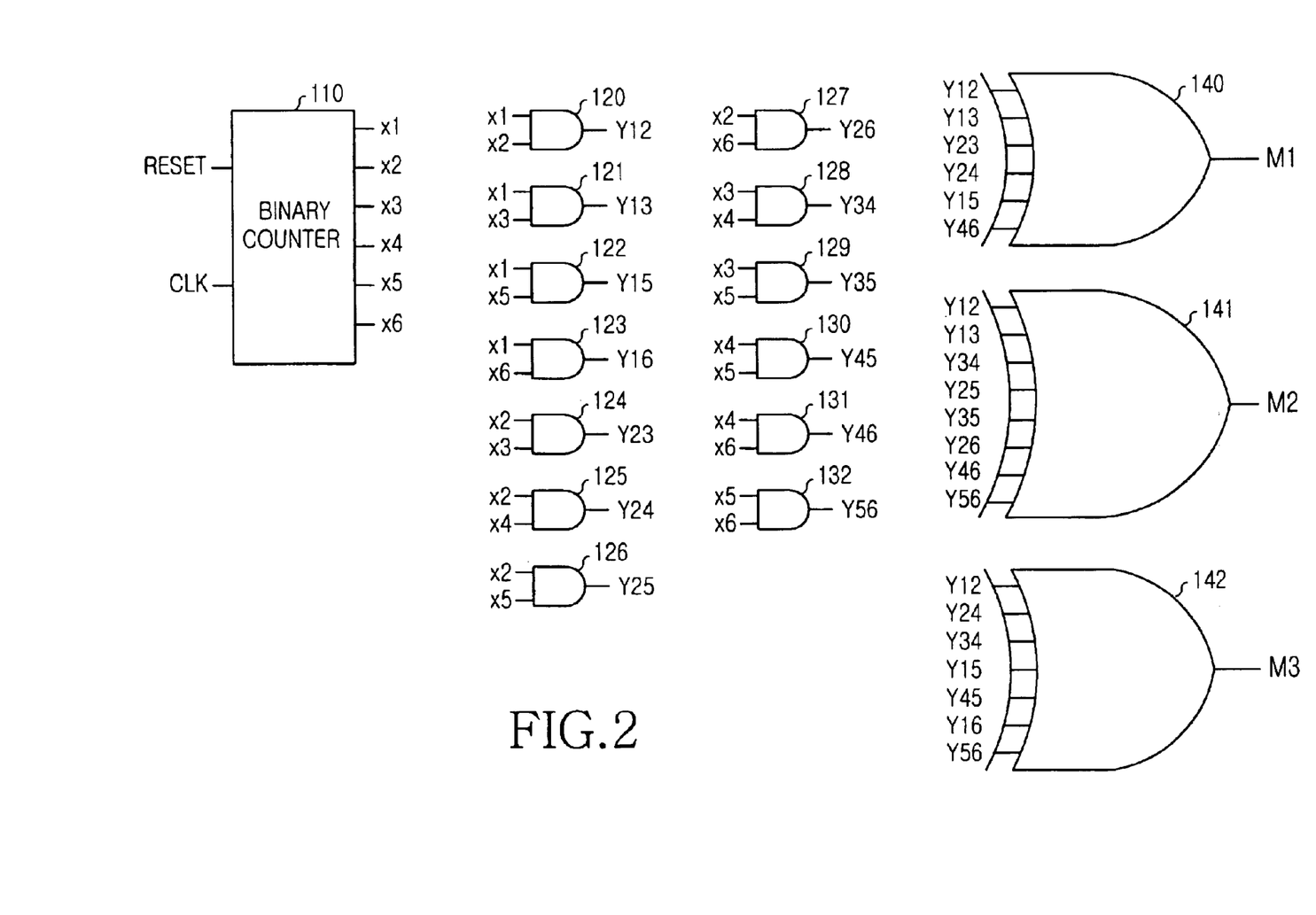
FIG. 2 illustrates a block diagram of a quasi-orthogonal code mask generating device.

FIG. 2 is a block diagram of a device for generating quasi-orthogonal code masks using Bent functions according to an embodiment of the present invention. Here, quasi-orthogonal code masks have a length of 64, by way of example.

Figure 3:
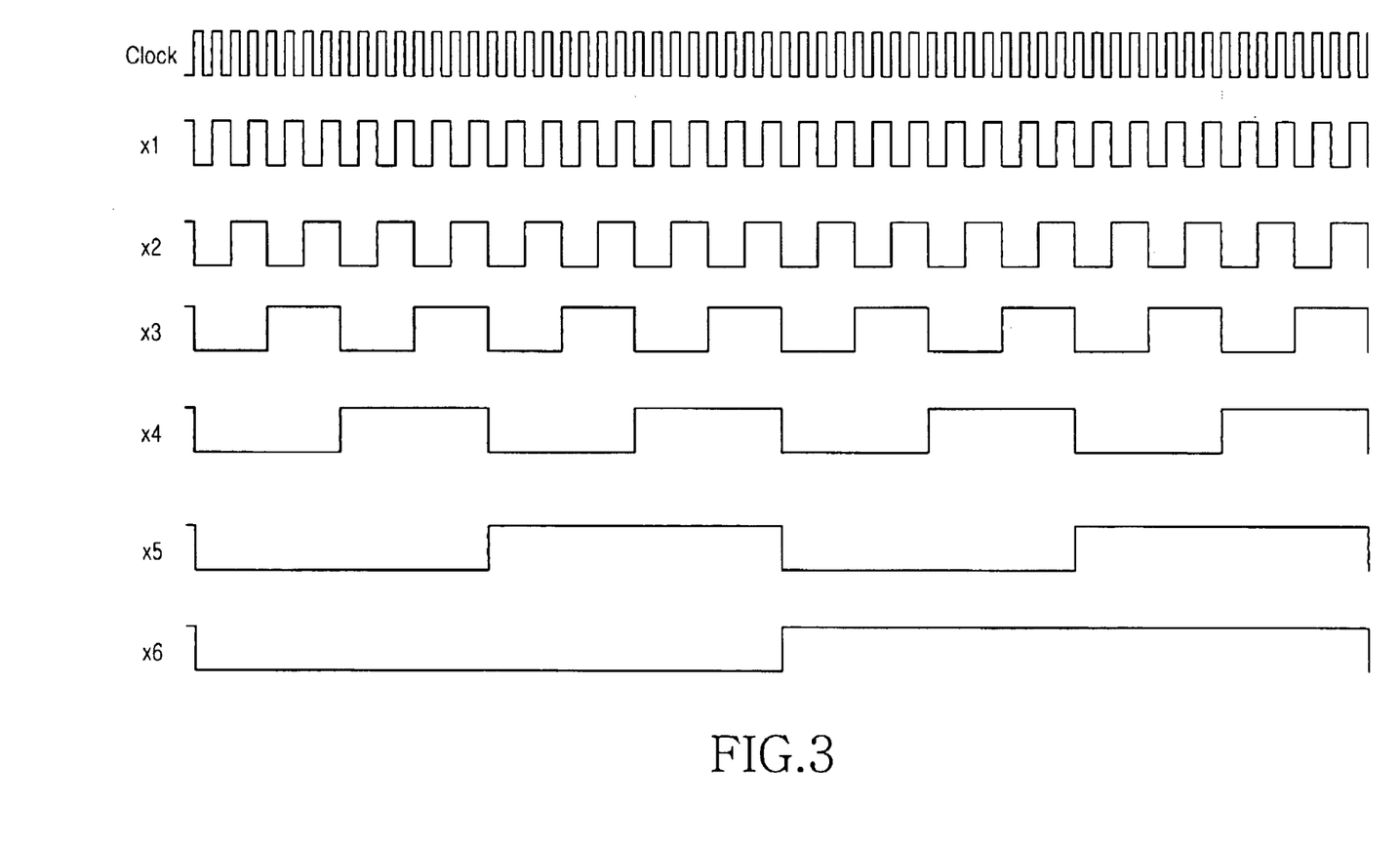
FIG. 3 illustrates the waveforms with respect to time of six clock signals output from a binary counter shown in FIG. 2.

Referring to FIG. 2, a binary counter 110 outputs six counter signals x1 to x6 corresponding to the Bent functions. The waveforms of the counter signals are illustrated in FIG. 3. A clock signal is input into the binary counter's 110 clock input CLK as a reference, and the following outputs are generated by the binary counter 110: a first counter signal x1, with a pulse width twice that of the reference clock signal; a second counter signal x2 with a pulse width twice that of the first counter signal x1, a third counter signal x3 with a pulse width twice that of the second counter signal x2, a fourth counter signal x4 with a pulse width twice that of the third counter signal x3, a fifth counter signal x5 with a pulse width twice that of the fourth counter signal x4, and a sixth counter signal x6 with a pulse width twice that of the fifth counter signal x5. An AND gate 120 outputs signal Y12 resulting from the input of the first and second counter signals x1 and x2. An AND gate 121 outputs signal Y13 resulting from the input of the first and third counter signals x1 and x3. An AND gate 122 outputs signal Y15 resulting from the input of the first and fifth counter signals x1 and x5. An AND gate 123 outputs signal Y16 resulting from the input of the first and sixth counter signals x1 and x6. An AND gate 124 outputs signal Y23 resulting from the input of the second and third counter signals x2 and x3. An AND gate 125 outputs signal Y24 resulting from the input of the second and fourth counter signals x2 and x4. An AND gate 126 outputs signal Y25 resulting from the input of the second and fifth counter signals x2 and x5. An AND gate 127 outputs signal Y26 resulting from the input of the second and sixth counter signals x2 and x6. An AND gate 128 outputs signal Y34 resulting from the input of the third and fourth counter signals x3 and x4. An AND gate 129 outputs signal Y35 resulting from the input of the third and fifth counter signals x3 and x5. An AND gate 130 outputs signal Y45 resulting from the input of the fourth and fifth counter signals x4 and x5. An AND gate 131 outputs signal Y46 resulting from the input of the fourth and sixth counter signals x4 and x6. An AND gate 132 outputs signal Y56 resulting from the input of the fifth and sixth counter signals x5 and x6.

An XOR gate 140 outputs the mask sequence M1 by X-ORing signals Y12, Y13, Y23, Y34, Y15, and Y46. An XOR gate 141 outputs the mask sequence M2 by X-ORing signals Y12, Y13, Y34, Y25, Y35, Y26, Y46, and Y56. An XOR gate 142 outputs the mask sequence M3 by X-ORing signals Y12, Y24, Y34, Y15, Y45, Y16, and Y56.

In operation, the binary counter 110 generates the six signals representing the Bent functions shown in Table 1. Model 74HC161 may be employed as a suitable binary counter 110, however, other suitable binary counters may be employed. As stated above, using the input of the first and second counter signals x1 and x2, the AND gate 120 produces signal Y12 which represents a sequence x1x2 which is used in the masks M1, M2, and M3. Similarly, using the input of the first and third counter signals x1 and x3, the AND gate 121 produces signal Y13 which represents a sequence x1x3 which is used in the masks M1 and M2. In this manner, the AND gates 120 to 132 operate to produce their respective signals, which are combined in appropriate combinations to generate mask sequences M1, M2 and M3 using XOR gates 140, 141, and 142, respectively. Accordingly, the input of Y12 (=x1x2), Y13 (=x1x3), Y23 (=x2x3), Y24 (=x2x4), Y15 (=x1x5), and Y46 (=x4x6), the XOR gate 140 generates the mask sequence M1 according to the formula for the mask M1 in Table 2. In the same manner, for the input of Y12 (=x1x2), Y13 (=x1x3), Y34 (=x3x4), Y25 (=x2x5), Y35 (=x3x5), Y26 (=x2x6), Y46 (=x4x6), and Y56 (=x5x6), the XOR gate 141 generates the mask sequence M2, and for the input of Y12 (=x1x2), Y24 (=x2x4), Y34 (=x3x4), Y15 (=x1x5), Y45 (=x4x5), Y16 (=x1x6), and Y56 (=x5x6), the XOR gate 142 generates the mask sequence M3.

Quasi-orthogonal codes with a length of 128 are generated in the same manner as the quasi-orthogonal codes with a length of 64. Similarly, a length-256 quasi-orthogonal mask generating device can be achieved by controlling the binary counter to produce clock signals of the intended length and configuring AND gates corresponding to the terms shown in Table 4.

Table 6 and Table 8 illustrate how the sequences of Table 5 and Table 7, respectively, which correspond to the sign component of the complex quasi-orthogonal code mask, can be expressed as a set of two-function combinations, similar to the binary quasi-orthogonal sequences of Table 3. Accordingly, in the case of the quasi-orthogonal sequences with length 256, the operators are constituted using the formulas of Table 6, thereby embodying the quasi-orthogonal mask generating device. Also, in the case of the quasi-orthogonal sequences with length 512, the operators are constituted using the formula of Table 8, thereby embodying the quasi-orthogonal mask generating device.

Figure 4A:
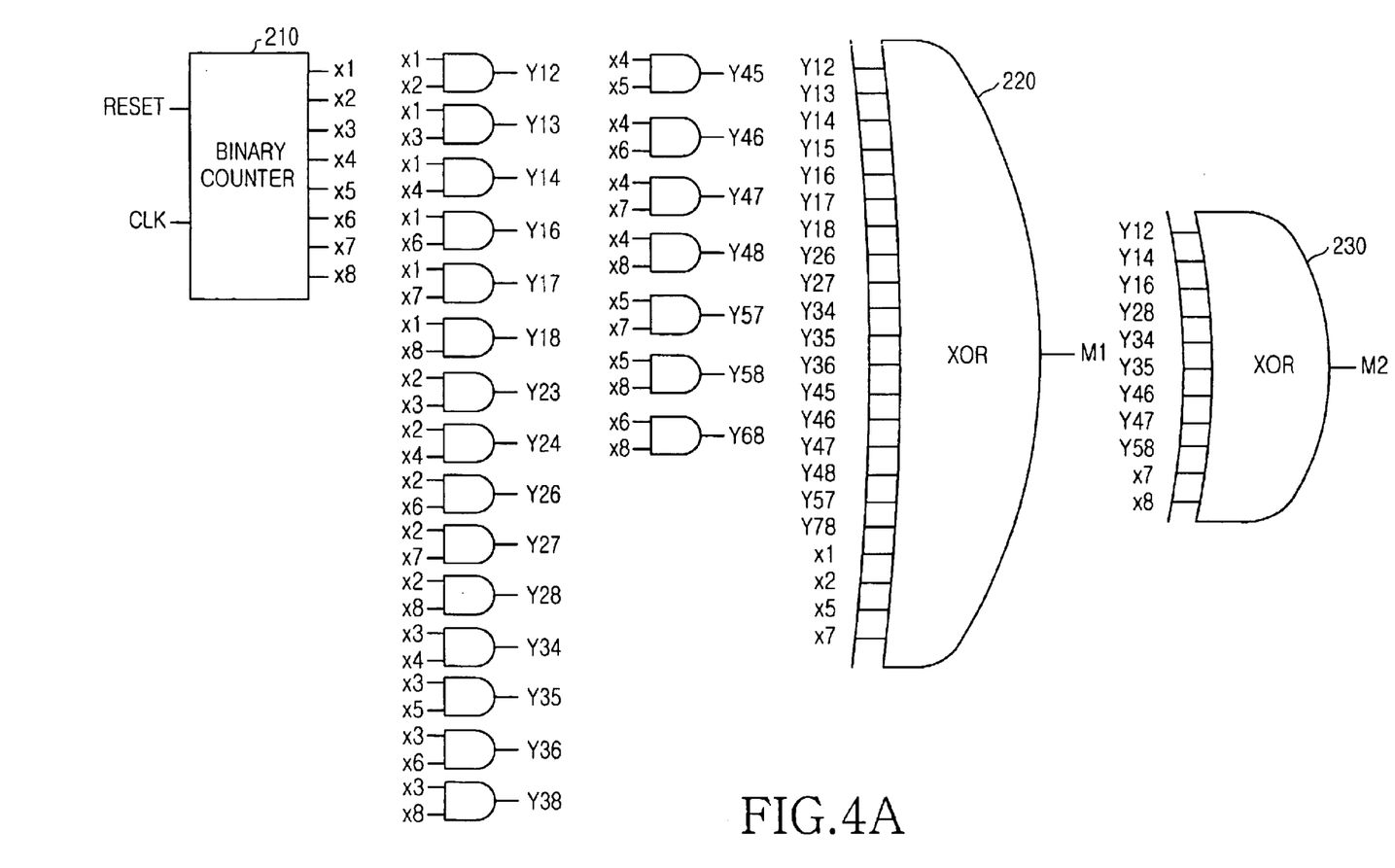
FIGS. 4A and 4B illustrate a block diagram of an alternate embodiment of a quasi-orthogonal code mask generating device.
Figure 4B:
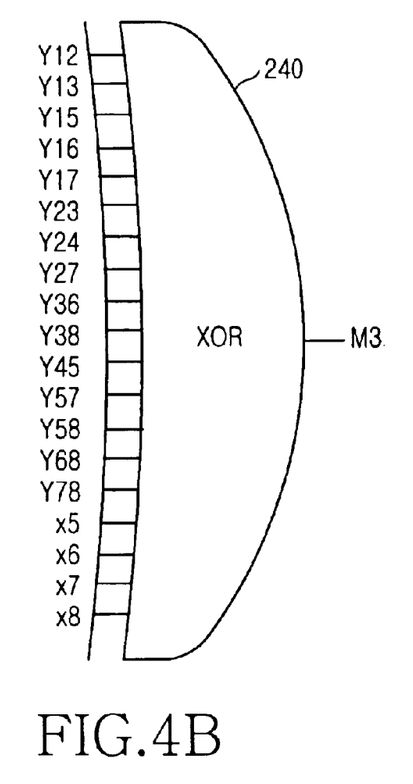
Figure 5A:
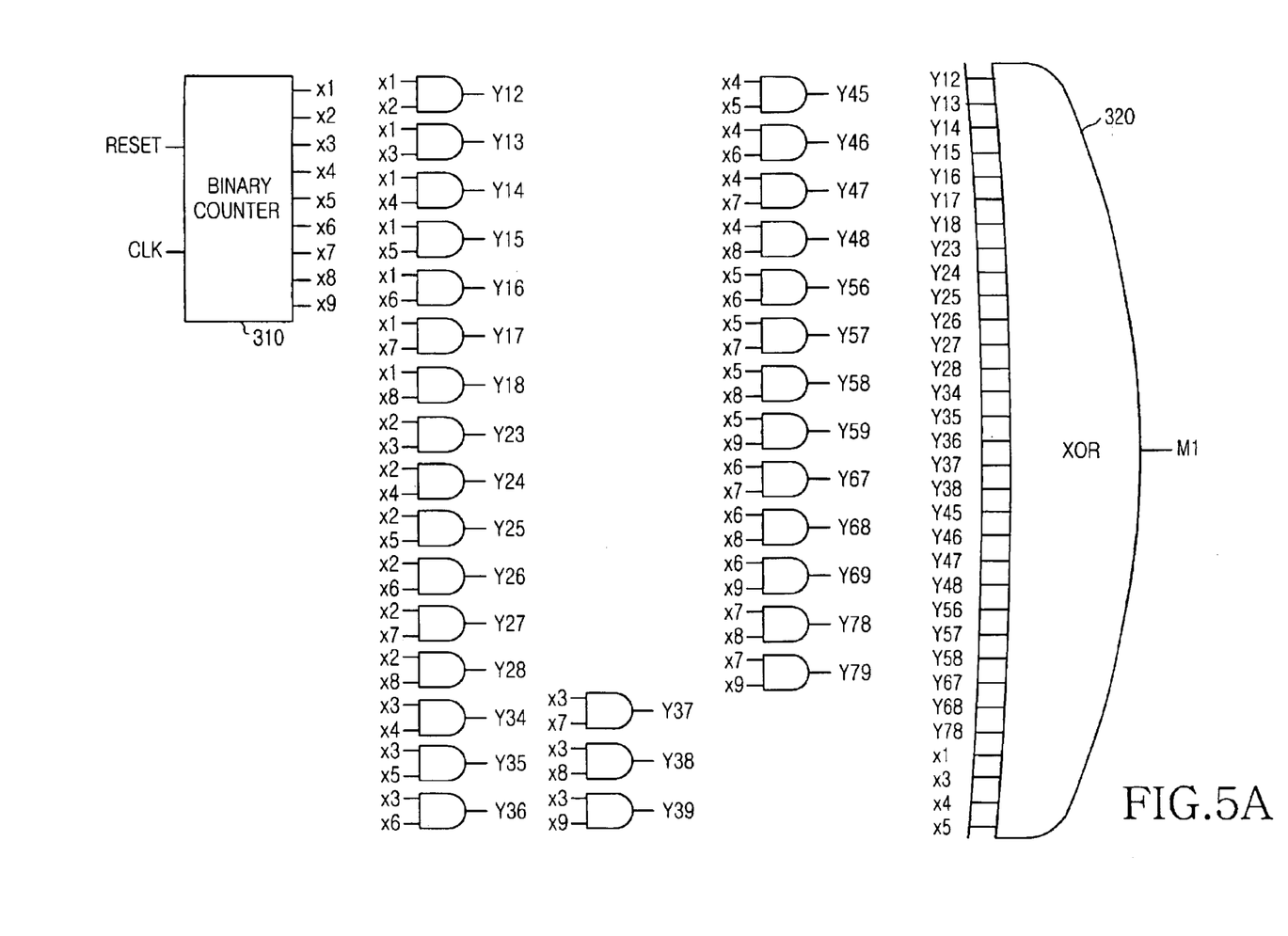
FIGS. 5A and 5B illustrate a block diagram of an alternate embodiment to a quasi-orthogonal code mask generating device.
Figure 5B:
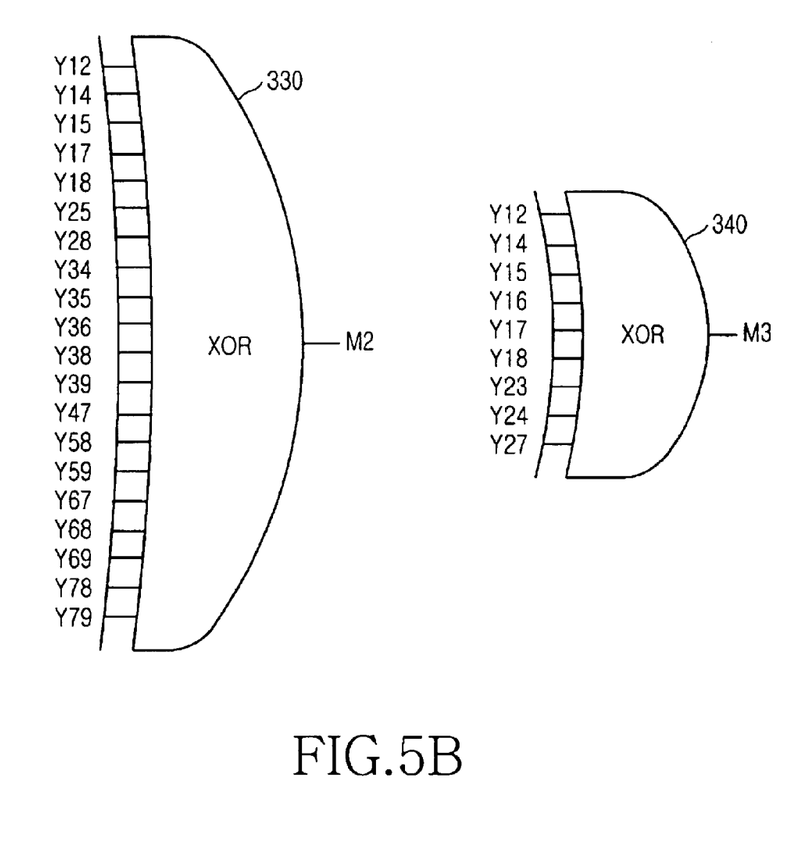

FIGS. 4A and 4B and 5A and 5B are block diagrams illustrating devices for generating quasi-orthogonal code masks using Bent functions according to the present invention. FIGS. 4A and 4B illustrate a device including a binary counter 210 for outputting eight counter signals x1 to x8 for generating length-256 quasi-orthogonal masks, and FIGS. 5A and 5B illustrate a device including a binary counter 310 for outputting nine counter signals x1 to x9 for generating length-512 quasi-orthogonal masks. Because the operation of these devices is the same as a the device illustrated in FIG. 2, which has already been described above, no additional description will be given here.

As described above, the present invention is advantageous in that quasi-orthogonal mask sequences are easily produced by implementing them using simple hardware.

While the present invention has been described in detail with reference to the specific embodiment, it is a mere exemplary application. Thus, it is to be clearly understood that many variations can be made by anyone of ordinary skill in the art while staying within the scope and spirit of the present invention as defined by the appended claims.

What is claimed is:

1. A device for generating a quasi-orthogonal code mask in a communication system, comprising:
   a counter for generating first to eighth signals $x1$–$x8$ representing Bent functions;
   a plurality of AND gates, each for receiving a different two of the first to eighth signals $x1$–$x8$; and
   a plurality of XOR gates, each for receiving a different combination of the outputs of the plurality of AND gates,
   wherein the plurality of AND gates and the plurality of XOR gates perform an operation to generate the quasi-orthogonal mask signal.

2. The device for generating a quasi-orthogonal code mask in a communication system as recited in claim 1, wherein the operation performed is $x1*x2+x1*x3+x1*x4+x1*x5+x1*x7+x1*x8+x2*x6+x2*x7+x3*x4+x3*x5+x3*x6+x4*x5+x4*x6+x4*x7+x4*x8+x5*x7+x7*x8+x1+x2+x5+x7$.

3. The device for generating a quasi-orthogonal code mask in a communication system as recited in claim 1, wherein the operation performed is $x1*x2+x1*x4+x1*x6+x2*x8+x3*x4+x3*x5+x4*x6+x4*x7+x5*x8+x7+x8$.

4. The device for generating a quasi-orthogonal code mask in a communication system as recited in claim 1, wherein the operation performed is $x1*x2+x1*x3+x1*x5+x1*x6+x1*x7+x2*x3+x2*x4+x2*x7+x3*x6+x3*x8+x4*x5+x5*x7+x5x8+x6*x8+x7*x8+x5+x6+x7+x8$.

5. The device for generating a quasi-orthogonal code mask in a communication system as recited in claim 1, wherein the operation performed is $x1*x2+x1*x3+x2*x4+x1*x5+x4*x5+x2*x6+x3*x6+x4*x6+x1*x7+x4*x7+x5*x7+x3*x8+x4*x8$.

6. The device for generating a quasi-orthogonal code mask in a communication system as recited in claim 1, wherein the operation performed is $x1*x2+x1*x3+x1*x4+x3*x4+x3*x5+x4*x5+x1*x6+x3*x6+x4*x6+x5*x6+x1*x7+x3*x7+x4*x7+x6*x7+x1*x8+x2*x8+x4*x8+x6*x8$.

7. The device for generating a quasi-orthogonal code mask in a communication system as recited in claim 1, wherein the operation performed is $x1*x2+x2*x3+x2*x4+x3*x4+x2*x5+x4*x5+x1*x6+x5*x6+x3*x7+x4*x7+x5*x7+x1*x8+x3*x8+x4*x8+x5*x8+x7*x8$.

8. The device for generating a quasi-orthogonal code mask in a communication system as recited in claim 1, wherein the operation performed is $x1*x2+x2*x3+x1*x4+x1*x5+x2*x5+x3*x5+x4*x5+x2*x6+x4*x6+x7+x6*x7+x2*x8+x4*x8+x5*x8+x6*x8+x7*x8$.

9. The device for generating a quasi-orthogonal code mask in a communication system as recited in claim 1, wherein the operation performed is $x1*x2+x2*x4+x3*x4+x2*x5+x3*x5+x4*x6+x3*x7+x4*x7+x6*x7+x5*x8+x7*x8$.

10. The device for generating a quasi-orthogonal code mask in a communication system as recited in claim 1, wherein the operation performed is $x1*x2+x1*x3+x2*x3+x2*x4+x1*x5+x3*x5+x1*x6+x2*x6+x3*x6+x5*x6+x1*x7+x4*x7+x6*x7+x1*x8$.

11. A device for generating a quasi-orthogonal code mask in a communication system, comprising:
    a counter for generating first to ninth signals $x1$–$x9$ representing Bent functions; and
    a plurality of AND gates, each for receiving a different two of the first to ninth signals $x1$–$x9$; and
    a plurality of XOR gates, each for receiving a different combination of the outputs of the plurality of AND gates,
    wherein the plurality of AND gates and the plurality of XOR gates perform an operation to generate the quasi-orthogonal mask signal.

12. The device for generating a quasi-orthogonal code mask in a communication system as recited in claim 11, wherein the operation performed is $x1*x2+x1*x3+x1*x4+x1*x5+x1*x6+x1*x7+x1*x8+x2*x3+x2*x4+x2*x5+x2*x6+x2*x7+x2*x8+x3*x4+x3*x5+x3*x6+x3*x7+x3*x8+x4*x5+x4*x6+x4*x7+x4*x8+x5*x6+x5*x7+x5*x8+x6*x7+x6*x8+x7*x8+x1+x3+x4+x5$.

13. The device for generating a quasi-orthogonal code mask in a communication system as recited in claim 11, wherein the operation performed is $x1*x2+x1*x4+x1*x5+x1*x7+x1*x8+x2*x5+x2*x8+x3*x4+x3*x5+x3*x6+x3*x8+x3*x9+x4*x7+x5*x8+x5*x9+x6*x7+x6*x8+x6*x9+x7*x8+x7*x9$.

14. The device for generating a quasi-orthogonal code mask in a communication system as recited in claim 11, wherein the operation performed is $x1*x2+x1*x4+x1*x5+x1*x6+x1*x7+x1*x8+x2+x3+x2*x4+x2*x7+x2*x9+x3*x6+x3*x7+x4*x5+x4*x8+x4*x9+x5*x7+x6*x7+x6*x8+x6*x9+x8*x9+x1+x2+x5+x7+x8$.

15. A device for generating a quasi-orthogonal code mask in a communication system, comprising:
    a counter for generating first to sixth signals $x1$–$x6$ representing Bent functions; and
    a plurality of AND gates, each for receiving a different two of the first to sixth signals $x1$–$x6$; and
    a plurality of XOR gates, each for receiving a different combination of the outputs of the plurality of AND gates,
    wherein the plurality of AND gates and the plurality of XOR gates perform an operation to generate the quasi-orthogonal mask signal.

16. The device for generating a quasi-orthogonal code mask in a communication system as recited in claim 15, wherein the operation performed is $x1*x2+x1*x3+x2*x3+x2*x4+x1*x5+x4*x6$.

17. The device as recited in claim 16, wherein the mask signal output from the operation is repeated twice to generate a mask of length 128.

18. The device for generating a quasi-orthogonal code mask in a communication system as recited in claim 15, wherein the operation performed is $x1*x2+x1*x3+x3*x4+x2*x5+x3*x5+x2*x6+x4*x6+x5*x6$.

19. The device as recited in claim 18, wherein the mask signal output from the operation is repeated twice to generate a mask of length 128.

20. The device for generating a quasi-orthogonal code mask in a communication system as recited in claim 15, wherein the operation performed is $x1*x2+x2*x4+x3*x4+x1*x5+x4*x5+x1*x6+x5*x6$.

21. The device as recited in claim 20, wherein the mask signal output from the operation is repeated twice to generate a mask of length 128.

* * * * *